(12) United States Patent
Sevalia et al.

(10) Patent No.: US 6,526,495 B1
(45) Date of Patent: Feb. 25, 2003

(54) MULTIPORT FIFO WITH PROGRAMMABLE WIDTH AND DEPTH

(75) Inventors: Piyush Sevalia, Campbell, CA (US); Raymond Leong, Los Altos, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/532,545

(22) Filed: Mar. 22, 2000

(51) Int. Cl.[7] .............................................. G06F 12/00
(52) U.S. Cl. ....................................................... 711/173
(58) Field of Search .............................. 711/5, 154, 170, 711/171, 172, 173

(56) References Cited

U.S. PATENT DOCUMENTS

| | | | | |
|---|---|---|---|---|
| 5,568,443 A | * | 10/1996 | Dixon et al. ............ | 365/189.02 |
| 5,594,702 A | * | 1/1997 | Wakeman et al. ........ | 345/501 |
| 5,809,557 A | * | 9/1998 | Shemla et al. ........... | 365/193 |
| 5,860,119 A | * | 1/1999 | Dockser .................. | 710/52 |
| 5,933,654 A | * | 8/1999 | Galdun et al. ........... | 710/22 |
| 6,044,225 A | * | 3/2000 | Spencer et al. .......... | 710/52 |
| 6,069,893 A | * | 5/2000 | Parruck et al. .......... | 370/395.42 |
| 6,229,812 B1 | * | 5/2001 | Parruck et al. .......... | 370/395.3 |
| 6,278,715 B1 | * | 8/2001 | Hansquine .............. | 370/412 |

* cited by examiner

*Primary Examiner*—Kevin Verbrugge
(74) *Attorney, Agent, or Firm*—Christopher P. Maiorana, P.C.

(57) ABSTRACT

A circuit comprising a memory array and a control circuit. The memory array generally comprises a plurality of storage queues. Each of the storage queues may be configured to (i) receive and store an input data stream and (ii) present an output data stream. The storage queues may be configured to operate either (i) independently or (ii) in combination to store the input data streams, in response to one or more control signals. The control circuit may be configured to present the one or more control signals to control an operation of the plurality of storage queues. The control signals may be configured to control the configuration of the plurality of storage queues.

20 Claims, 8 Drawing Sheets

MULTIPORT FIFO WITH PROGRAMMABLE WIDTH AND DEPTH

FIELD OF THE INVENTION

The present invention relates to multiport FIFOs generally and, more particularly, to a multiport FIFO with programmable width and depth.

BACKGROUND OF THE INVENTION

Conventional approaches for implementing multi-queue buffering systems may implement multiple discrete FIFOs. Different applications may require discrete FIFOS with different depths and widths.

Implementing multiple FIFOs may require larger board area (e.g., due to multiple discrete packages and more complex routing), higher power consumption, longer trace lengths, and potentially higher cost (e.g., due to many discrete devices being used, as well as the cost of inventorying devices of differing widths and depths), than a single FIFO implementation.

SUMMARY OF THE INVENTION

The present invention concerns a circuit comprising a memory array and a control circuit. The memory array generally comprises a plurality of storage queues. Each of the storage queues may be configured to (i) receive and store an input data stream and (ii) present an output data stream. The storage queues may be configured to operate either (i) independently or (ii) in combination, to store the input data streams, in response to one or more control signals. The control circuit may be configured to present the one or more control signals to control an operation of the plurality of storage queues. The control signals may be configured to control the configuration of the plurality of storage queues.

The objects, features and advantages of the present invention include providing a multiport FIFO that may implement (i) a configurable number of queues within the same memory device, (ii) multiple ports available on the device for simultaneous access to multiple queues, (iii) configurable depth and width of the multiport FIFO, (iv) flag logic block that may be disabled or enabled and/or (v) a special case of device operation where only one input and output port is implemented, yet data can be stored into multiple, selectable FIFO queues.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
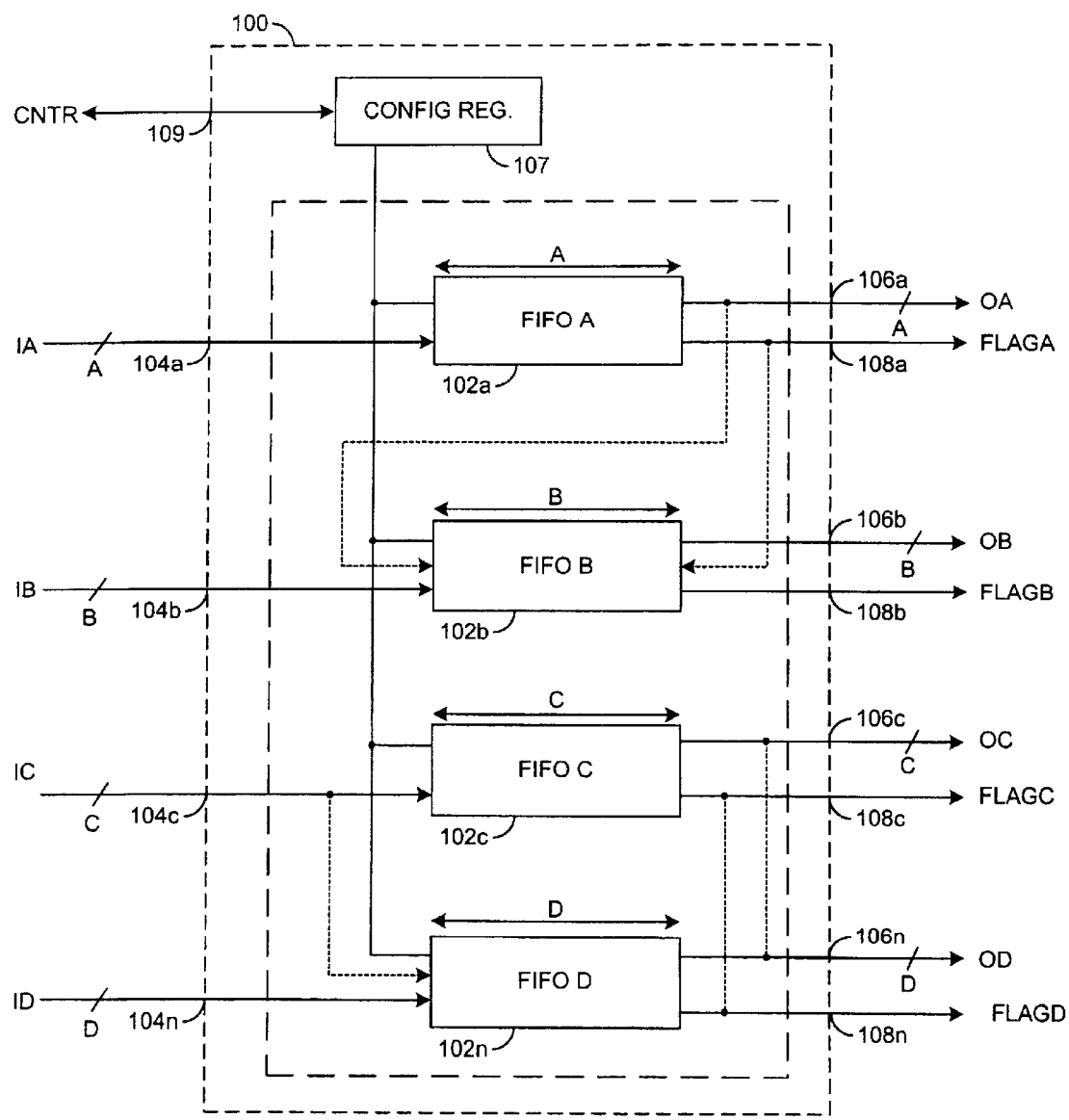
FIG. 1 is a block diagram of a preferred embodiment of the present invention.

Referring to FIG. 1, a block diagram of a circuit 100 is shown in accordance with a preferred embodiment of the present invention. The circuit 100 generally comprises a number of storage queues 102a–102n, a number of data inputs 104a–104n, a number of data outputs 106a–106n, a configuration register 107 and a number of flag outputs 108a–108n. The number of inputs 104a–104n, the number of FIFO blocks 102a–102n and the number of data outputs 108a–108n may each be varied accordingly to meet the design criteria of a particular implementation. The configuration register 107 may be implemented, in one example, as a control circuit.

The circuit 100 may allow users to access and/or control the multiple FIFO storage queues 102a–102n within a single package. Datacom and telecom applications generally need simultaneous access to one or more storage queues (FIFO storage queues 102a–102n). The data in each of the storage queues generally follows the FIFO format (i.e., first-in, first-out). The circuit 100 may allow such access. Additionally, the width and/or depth of the circuit 100 may depend on the architecture of the particular implementation. Without the circuit 100, several separate FIFOS would generally be implemented, each with different data widths and/or depths, to satisfy such requirements. Such a multiple FIFO implementation may cause inventory and other problems described in the background section. The circuit 100 may ease such inventory issues by allowing the user to configure the depth and/or the width of the circuit 100 depending upon a configuration (series and/or parallel) of the storage queues 102a–102n. In such an implementation, only a single device may need to be stocked that may fulfill various design considerations.

The circuit 100 may implement an architecture having a multiport, flexible FIFO that may be scalable to different widths (e.g., a, b, c and d) and depths (e.g., A, B, C and D). The circuit 100 may be constructed from one large block of memory that may be configured into several sub-blocks (e.g., the storage queues 102a–102n) of different widths and depths. The FIFO storage queues 102a–102n may each comprise (i) a flag logic circuit, (ii) read logic circuits and (iii) write logic circuits (not shown). Examples of suitable flag logic circuits may be found in U.S. Pat. Nos. 5,712,992; 5,809,339; 5,991,834; 5,627,797; 5,850,568; 5,852,748 and/or 5,978,868, which are each hereby incorporated by reference in their entirety. Examples of read logic circuits and write logic circuits may be found in U.S. Pat. Nos. 5,712,820; 5,682,356; 5,764,967; 5,828,992; and/or 5,963,499, which are each hereby incorporated by reference in their entirety. However, other implementations of the flag logic circuits, the read logic circuits and the write logic circuits may be implemented accordingly to meet the design criteria of a particular implementation. The control register 107 may control each of the flag logic circuits of the FIFO storage queues 102a–102n.

The circuit 100 may be configured, in one example, in response to voltage levels on one or more input pins 109. Alternately, the input pins 109 may be implemented as a user interface (e.g., a serial interface, a parallel interface, etc.) that may be used to write to the internal configuration register 107. The configuration register may be implemented, in one example, as a state machine or other combinational logic. A special case of the above multiport FIFO 100 may be implemented when only one input port and one output port is used to drive data in and out of the FIFO storage queues within the circuit 100. The capability to disable individual read logic circuits, write logic circuits and flag logic circuits may be useful in situations where there are less FIFO storage queues 102a–102n than the total number of flag logic circuits (e.g., a series and/or parallel configuration).

The circuit 100 may have a configurable depth and/or width. The FIFO storage elements 102a–102n may be implemented in an appropriate series and/or parallel combination in order to achieve a particular depth and/or width (to be discussed in connection with FIGS. 2–7). In such a configuration, additional multiplexer logic may be required on the input and output of the serial and/or parallel configuration (to be discussed in connection with FIG. 8). Such multiplexer logic is generally driven by control signals which route the data into the appropriate FIFO storage queue(s) 102a–102n (e.g., during writes) and out of the appropriate storage queue(s) 102a–102n (e.g., during reads). The control signals may be provided along with the data to be read or written at the data inputs 104a–104n or by the configuration register 107.

The circuit 100 illustrates one implementation of a multiport, multiqueue FIFO circuit 100. The circuit 100 is shown in the context of an illustrative example having internal FIFO storage queues 102a–102n, each of (i) varying size widths (a, b, c, and d) and (ii) varying size depths (A, B, C and D). The queues 102a–102n may each implement one or more (i) of the flag logic circuits, (ii) the read logic circuits and/or (iii) the write logic circuits, respectively. The particular number of FIFO storage queues 102a–102n is generally equal to the number of data inputs 104a–104n and data outputs 106a–106n (e.g., I/O ports). However, if there are more storage queues 102a–102n than I/O ports, then the circuit 100 will generally require an additional multiplexer at the input and output to route the data (to be discussed in connection with FIG. 8). The multiplexers may allow a user to select (i) a width and/or depth of the FIFO queues 102a–102n and (ii) a particular storage queue 102a–102n to write to and/or read from.

Figure 2:
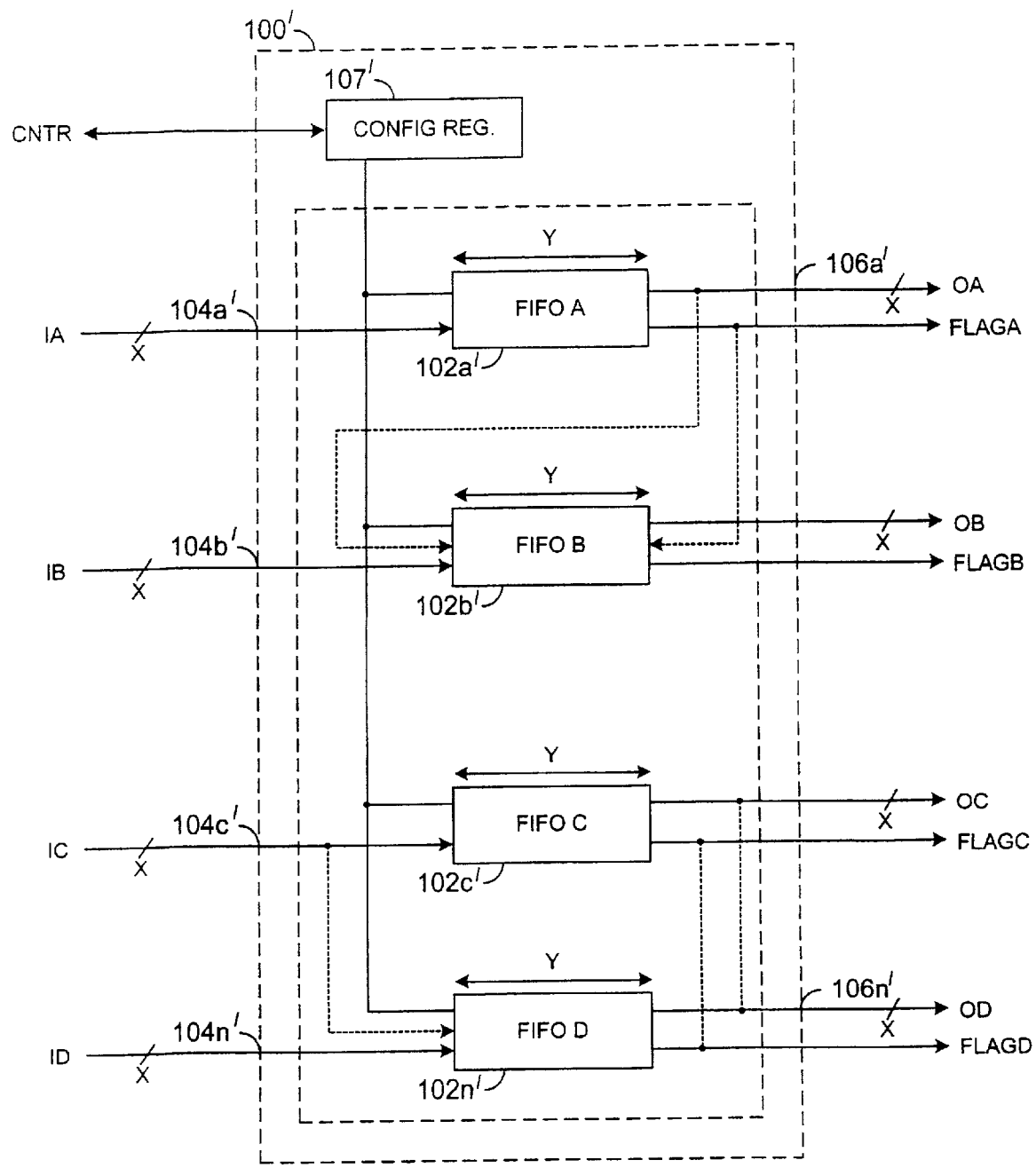
FIG. 2 is a block diagram of an example configuration of the present invention.

Referring to FIG. 2, an example configuration of the circuit 100 is shown marked with primed notation. The circuit 100' may configure the FIFO queues 102a'–102n' each with a width (x) and a depth (y). Each of the FIFO queues 102a'–102n' may be implemented independently. Each of the FIFO queues 102a'–102n' may additionally comprise cascading logic (not shown). The cascading logic may allow the inputs 104a'–104n' and the outputs 106a'–106n' to cascade data during reading and writing operations.

Figure 3:
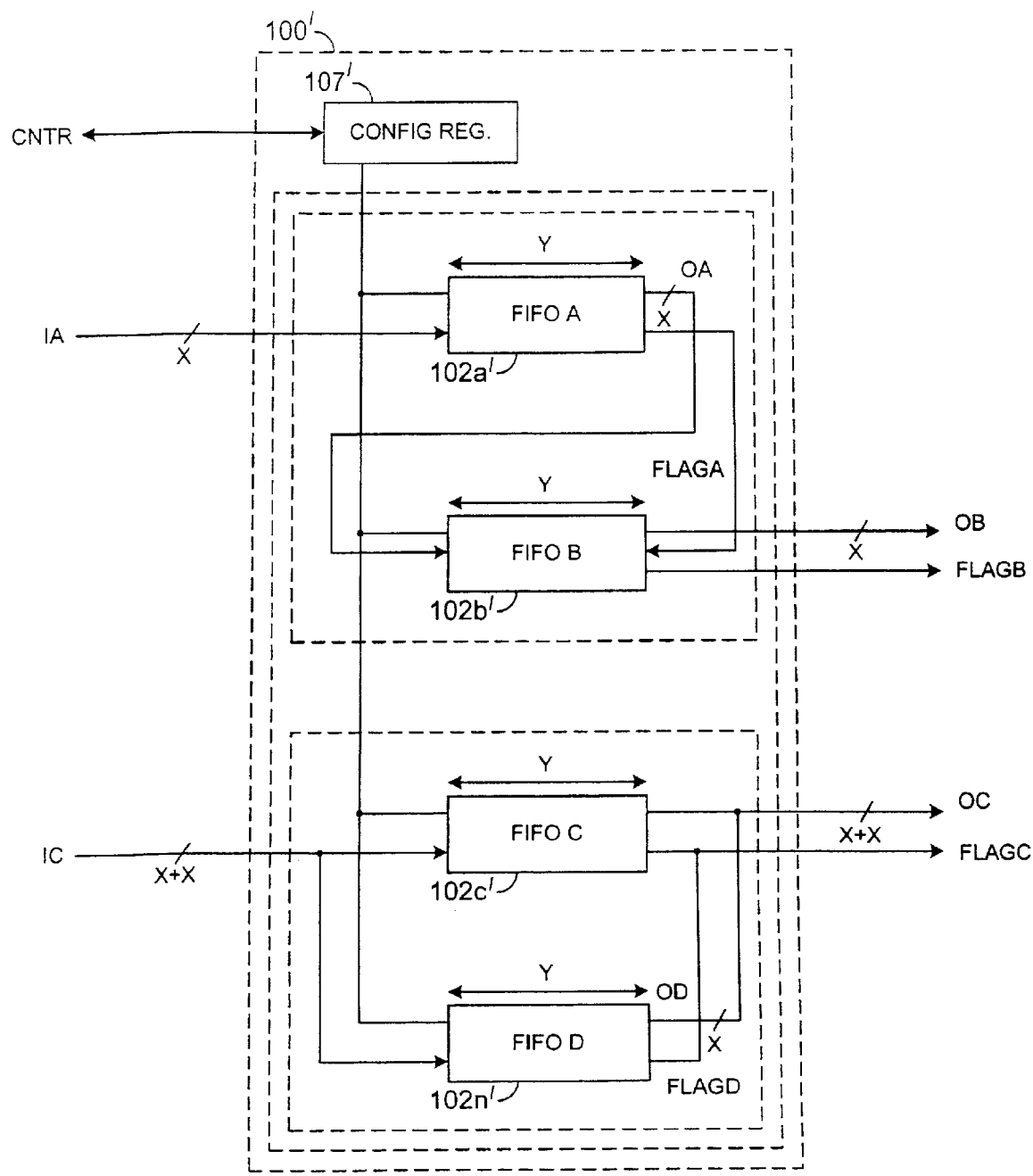
FIG. 3 is a block diagram of an example configuration of the present invention.

Referring to FIG. 3, an example configuration of the circuit 100 is shown marked with primed notation. The circuit 100' may configure the FIFO queues 102a' and 102b' (e.g., FIFO A and FIFO B) in series with a width (x) and a depth (2y). The circuit 100' may configure the FIFO queues 102c' and 102n' (e.g., FIFO C and FIFO D) in parallel with a width (2x) and a depth (y). However, the circuit 100' may implement any depth (series) and/or width (parallel) combination in order to meet the criteria of a particular implementation.

Figure 4:
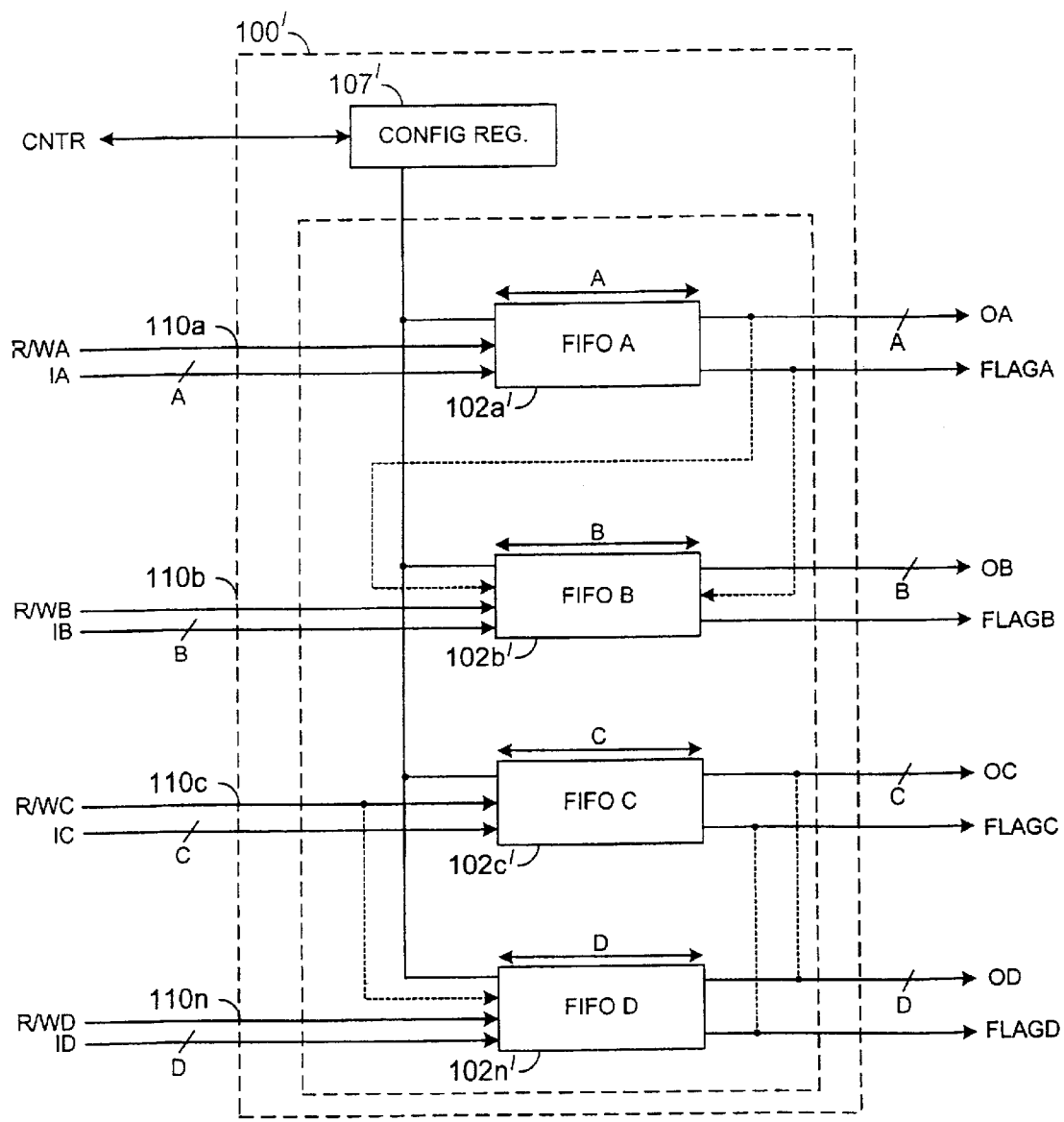
FIG. 4 is a block diagram of an example configuration of the present invention.

Referring to FIG. 4, another example configuration of the circuit 100 is shown marked with primed notation. In such an example, the width and/or depth of each of the storage queues 102a'–102n' may vary. The FIFO queues 102a'–102n' may be implemented independently having (i) varying widths a, b, c and d and (ii) varying depths A, B, C and D. Additionally, each FIFO queue 102a'–102n' may have an input 110a–110n that may receive a control signal (e.g., R/WA–R/WD). The control signals R/WA–R/WD may be implemented as, in one example, read and write control signals. The read and write control signals R/WA–R/WD may control reading and writing to/from the FIFO queues 102a'–102n'. The configuration register 107' may control a configuration (e.g., series and/or parallel combination) of the queues 102a'–102n'.

Figure 5:
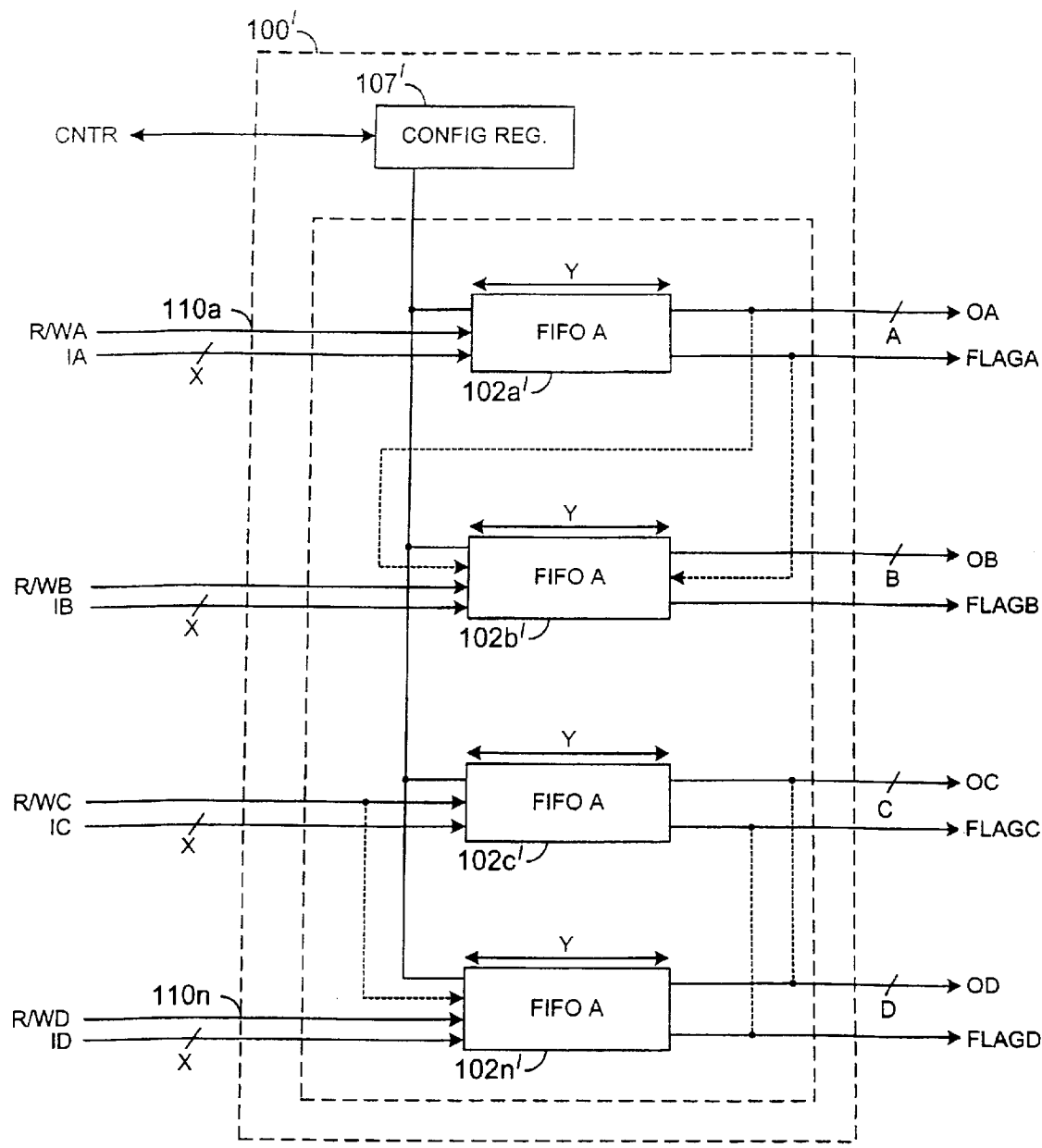
FIG. 5 is a block diagram of an example configuration of the present invention.

Referring to FIG. 5, another example configuration of the circuit 100 is shown marked with primed notation. The circuit 100' may implement the FIFO queues 102a'–102n' each with a width (x) and a depth (y). Each of the FIFO queues 102a'–102n' may be implemented independently. Additionally, each FIFO queue 102a'–102n' may have an input 110a–110n that may receive the control signals R/WA–R/WD. The read and write control signals R/WA–R/WD may control reading and writing to/from the FIFO queues 102a'–102n' The configuration register 107' may control a configuration (e.g., series and/or parallel combination) of the queues 102a'–102n'.

Figure 6:
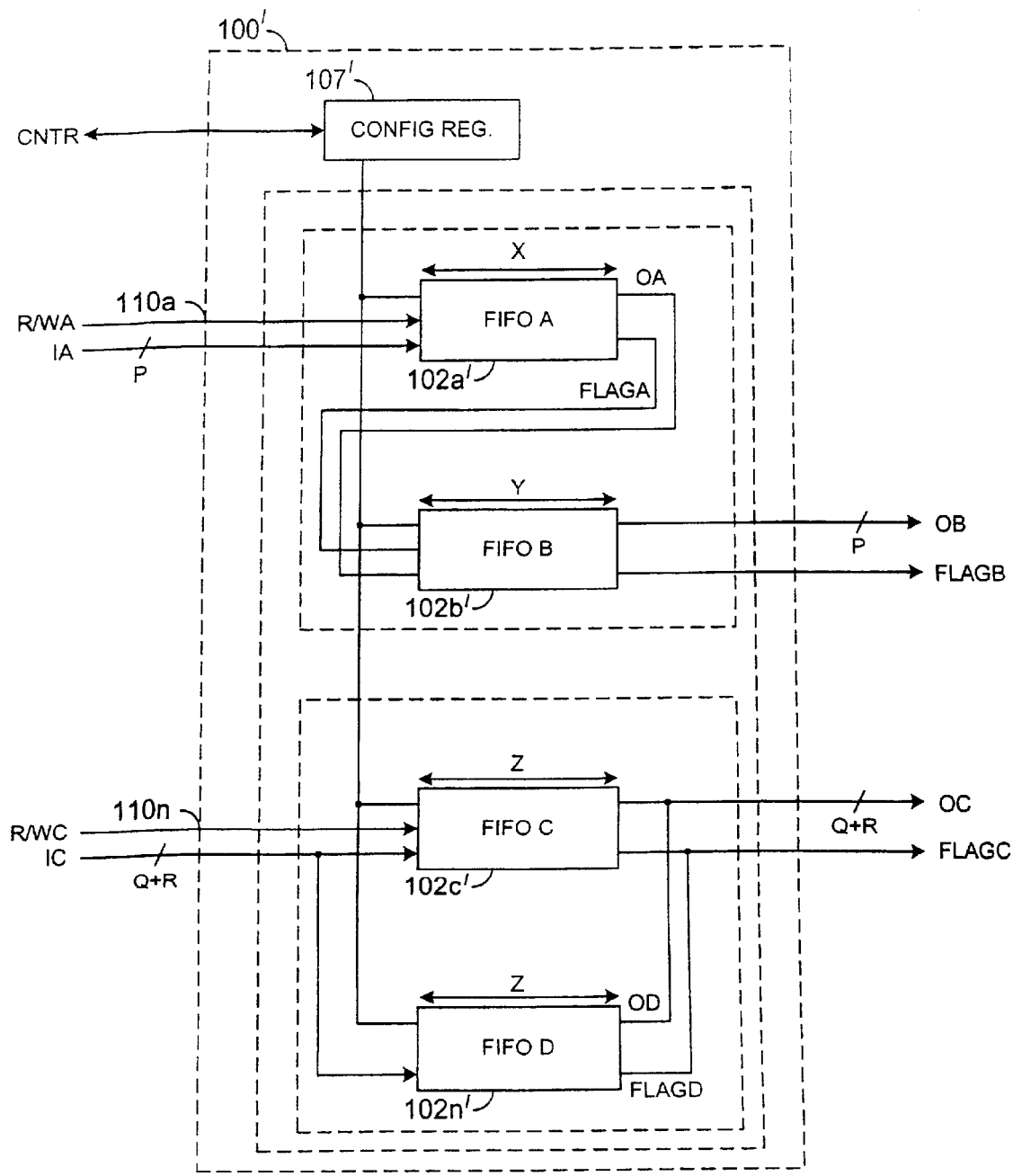
FIG. 6 is a block diagram of an example configuration of the present invention.

Referring to FIG. 6, an example configuration of the circuit 100 is shown marked with primed notation. The queue 102a' may have a width (p) and a depth (x). The queue 102b' may have a width (p) and a depth (y). The queue 102c' may have a width (q) and a depth (z). The queue 102n' may have a width (r) and a depth (z). The circuit 100' may implement the FIFO queues 102a' and 102b' (e.g., FIFO A and FIFO B) in series combination with a width (p) and a depth (x+y). The circuit 100' may implement the FIFO queues 102c' and 102n' (e.g., FIFO C and FIFO D) in parallel combination with a width (q+r) and a depth (z). The circuit 100' may implement any depth (series) and/or width (parallel) combination in order to meet the criteria of a particular implementation. Additionally, each FIFO queue 102a'–102n' may have an input 110a–110n that may receive the control signals R/WA–R/WD. The read and write control signals R/WA–R/WD may control reading and writing to/from the FIFO queues 102a'–102n'. The configuration register 107' may control a configuration (e.g., series and/or parallel combination) of the queues 102a'–102n'.

Figure 7:
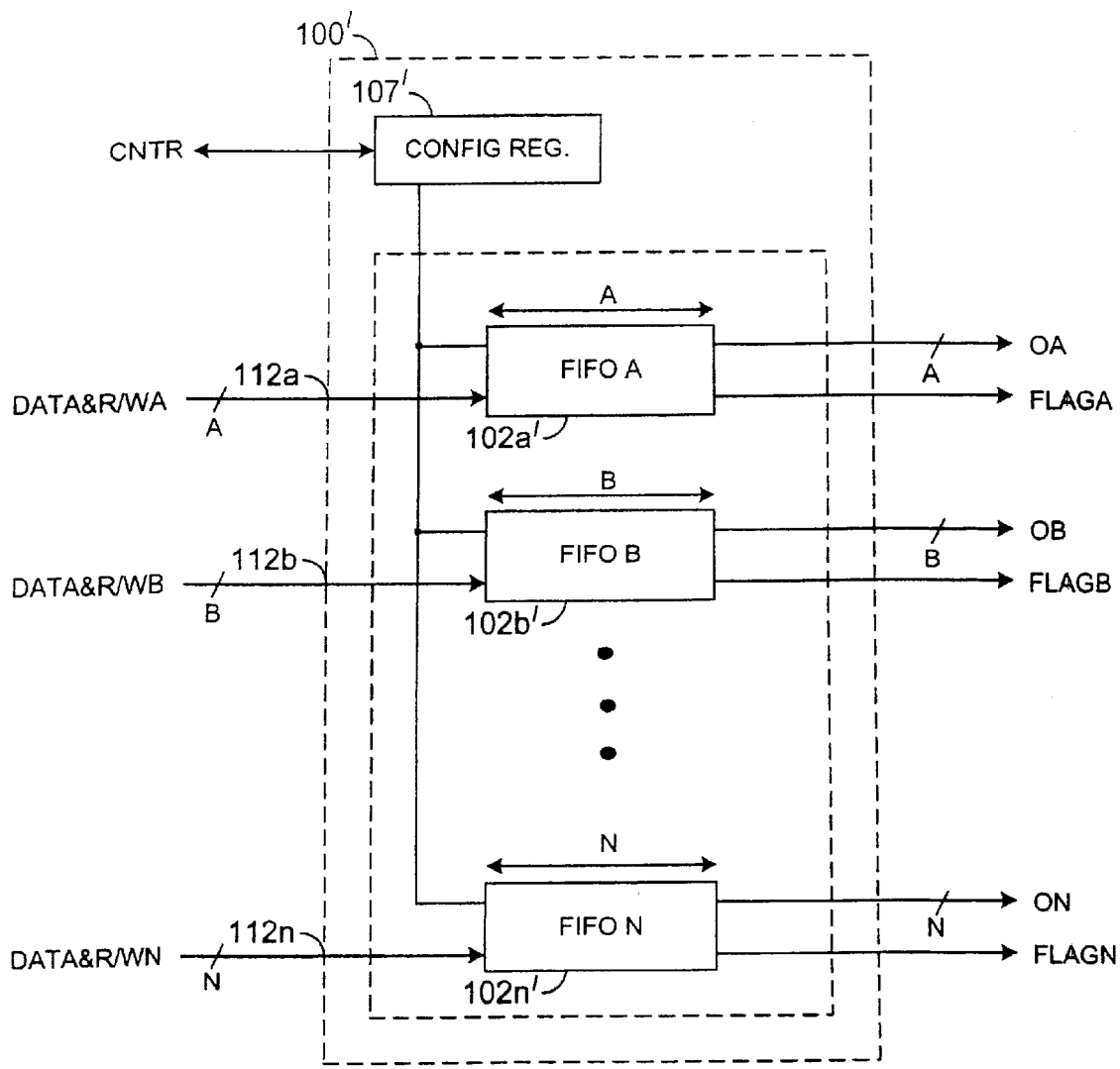
FIG. 7 is a block diagram of an example configuration of the present invention.

Referring to FIG. 7, another example configuration of the circuit 100 is shown marked with primed notation. In such an example, the width and/or depth of each of the storage queues 102a'–102n' may vary. The FIFO queues 102a'–102n' may be implemented independently having (i) varying widths a, b, c and d and (ii) varying depths A, B, C and D. Additionally, each FIFO queue 102a'–102n' may have an input 112a–112n that may receive a signal (e.g., DATA&R/WA–DATA&R/WD). The signals DATA&R/WA–DATA&R/WD may be implemented as, in one example, data signals, as well as, read and write control signals. The data and read/write control signals DATA&R/WA–DATA&R/WD may control reading and writing to/from the FIFO queues 102a'–102n'. The configuration register 107' may control a configuration (e.g., series and/or parallel combination) of the queues 102a'–102n'.

Figure 8:
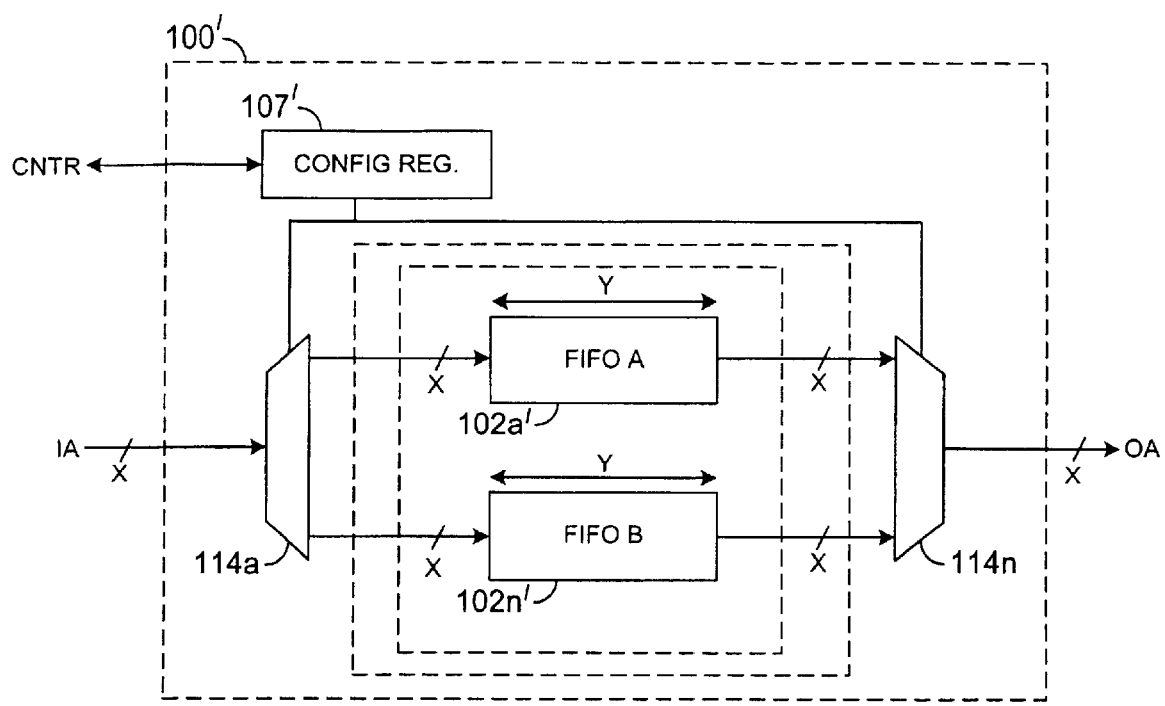
FIG. 8 is a block diagram of an alternate embodiment of the present invention.

Referring to FIG. 8, an alternate embodiment of the circuit 100 is shown marked with primed notation. The circuit 100' may implement the FIFO queues 102a'–102n' each with a width (x) and a depth (y). Additionally, the circuit 100' may implement a number of multiplexers 114a–114n. The circuit 100' may implement the multiplexers 114a–114n to cascade the FIFO-queues 102a'–102n' into a larger FIFO queue (e.g., FIFO A+FIFO B). The multiplexer 114a may route the input data IA into either the queue 102a' or the queue 102n'. The multiplexer 114a may route the data in response to the configuration register 107'. The configuration register may route the data in response to a number of conditions (e.g., full, half full, speed, etc.) of the FIFO queues 102a'–102n'. Reading data from the FIFO queues 102a'–102n' is generally accomplished in a similar manner.

The present invention may offer an integrated solution to implementing a single-chip buffer circuit 100 that may have flexibility for the customer and may save on board space, as well as, cost. Also, since the present invention may be implemented as an integrated solution, read and write times may be improved (e.g., less latency) when compared with applications using discrete devices.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
   a memory array comprising a plurality of storage queues, each of said storage queues configured to (i) receive and store an input data stream and (ii) present an output data stream, wherein said storage queues are configured to operate either (i) independently or (ii) in combination to store said input data stream, in response to one or more control signals; and
   a control circuit configured to present said one or more control signals to control an operation of said plurality of storage queues, wherein said control signals are each configured to control (i) said configuration and (ii) a depth and a width of said plurality of storage queues.

2. The circuit according to claim 1, wherein said control circuit comprises a register circuit.

3. The circuit according to claim 1, wherein each of said storage queues is further configured to generate a status flag.

4. The circuit according to claim 1, wherein each of said storage queues is read from and/or written to an input/output port in response to one or more read and write control signals.

5. The circuit according to claim 4, wherein said configuration of said plurality of storage queues is user-configurable.

6. The circuit according to claim 1, wherein said plurality of storage queues are first-in first-out storage queues.

7. The circuit according to claim 1, wherein said plurality of storage queues each comprise a flag logic block.

8. The circuit according to claim 7, wherein said control circuit is configured to control each of said flag logic blocks.

9. The circuit according to claim 8, wherein said flag logic blocks are disabled or enabled in response to the configuration of said plurality of storage queues.

10. The circuit according to claim 4, wherein said circuit comprises more storage queues than input/output ports.

11. The circuit according to claim 10, wherein said circuit further comprises a first multiplexer at one of said input/output ports and a second multiplexer at another of said input/output ports.

12. The circuit according to claim 1, wherein said configuration comprises (i) two or more of said plurality of storage queues in a series configuration and (ii) two or more of said plurality of storage queues in a parallel configuration.

13. An apparatus comprising:
   means for (i) receiving and storing an input data stream in a plurality of storage queues and (ii) presenting an output data stream, wherein said storage queues are configured to operate either (i) independently or (ii) in combination to store said input data stream, in response to one or more control signals;
   means for presenting said one or more control signals to control an operation of said plurality of storage queues; and
   means for controlling (i) said configuration and (ii) a depth and a width of said plurality of storage queues in response to said control signals.

14. A method for accessing a plurality of storage queues within the same packages comprising the steps of:
   (A) receiving an input data stream;
   (B) storing said input data stream; and
   (C) configuring said plurality of storage queues to operate either (i) independently or (ii) in combination to store said input data streams and controlling (i) said configuration and (ii) a depth and a width of said plurality of storage queues.

15. The method according to claim 14, further comprising the step of:
   (D) generating a status flag for each of said plurality of storage queues.

16. The method according to claim 15, wherein said configuration of said plurality of storage queues is user-configurable.

17. The method according to claim 16, wherein said plurality of storage queues are first-in first-out storage queues and said method further comprises writing to and reading from said storage queues in response to one or more read and write control signals.

18. The method according to claim 16, wherein step B further comprises controlling step (D).

19. The method according to claim 18 wherein step B further comprises disabling or enabling step (D).

20. The method according to claim 14, wherein said configuration comprises (i) two or more of said plurality of storage queues in a series configuration and/or (ii) two or more of said plurality of storage queues in a parallel configuration.

* * * * *